Figure 1:
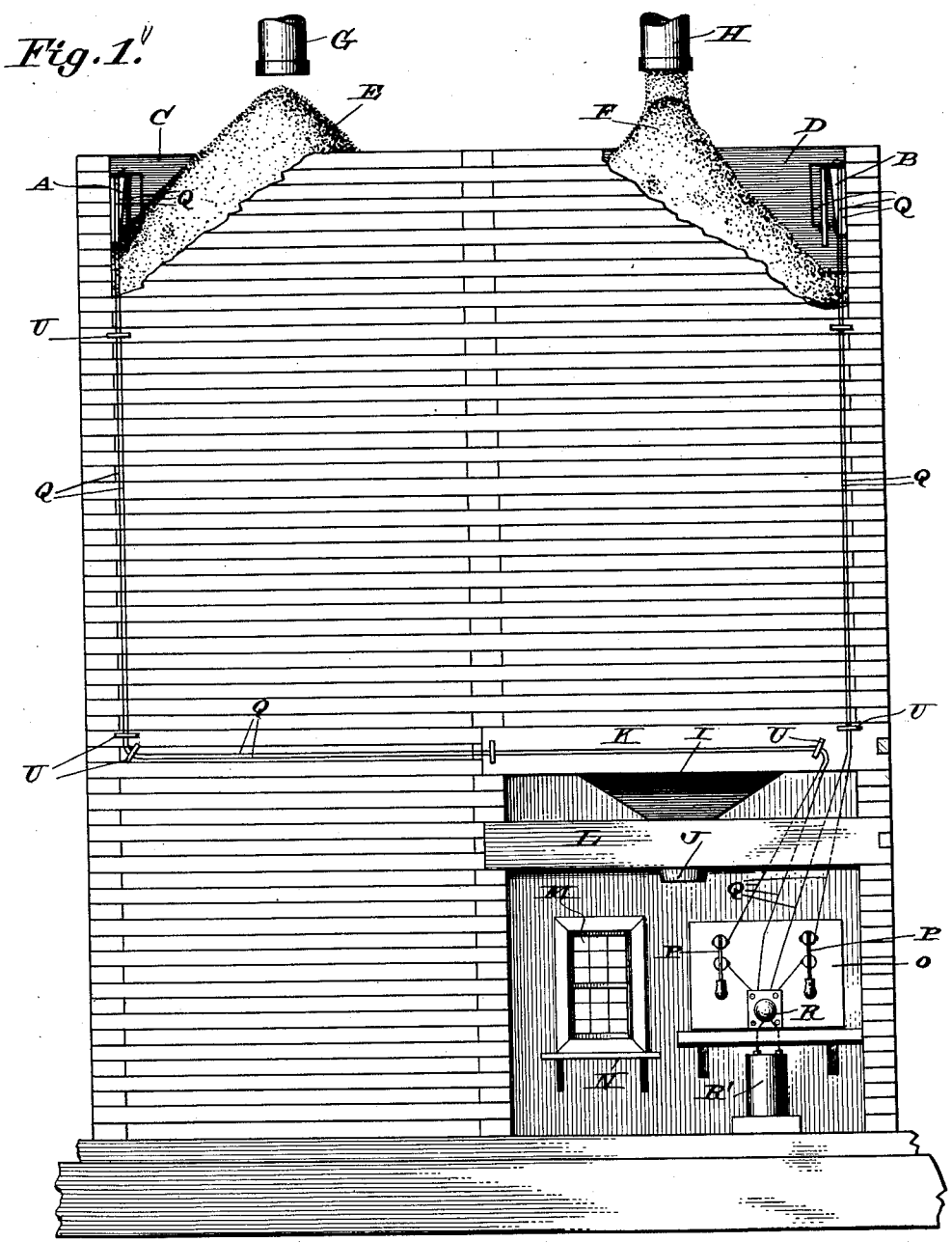

No. 828,655. PATENTED AUG. 14, 1906.
D. H. HOUSTON, DEC'D.
A. L. HOUSTON, ADMINISTRATRIX.
INDICATING AND WARNING ATTACHMENT FOR GRAIN BINS.
APPLICATION FILED SEPT. 18, 1905.

2 SHEETS—SHEET 1.

WITNESSES:

INVENTOR
D. H. Houston

No. 828,655. PATENTED AUG. 14, 1906.
D. H. HOUSTON, DEC'D.
A. L. HOUSTON, ADMINISTRATRIX.
INDICATING AND WARNING ATTACHMENT FOR GRAIN BINS.
APPLICATION FILED SEPT. 18, 1905.

2 SHEETS—SHEET 2.

WITNESSES:

INVENTOR
D. H. Houston

UNITED STATES PATENT OFFICE.

DAVID H. HOUSTON, OF HUNTER, NORTH DAKOTA; ANNIE L. HOUSTON ADMINISTRATRIX OF SAID DAVID H. HOUSTON, DECEASED.

INDICATING AND WARNING ATTACHMENT FOR GRAIN-BINS.

No. 828,655.  Specification of Letters Patent.  Patented Aug. 14, 1906.

Application filed September 18, 1905. Serial No. 279,052.

*To all whom it may concern:*

Be it known that I, DAVID H. HOUSTON, a citizen of the United States of America, residing at Hunter, in the county of Cass and State of North Dakota, have invented certain new and useful Improvements in Indicating and Warning Attachments for Grain-Bins, of which the following is a specification.

My invention is a device for announcing the fullness of grain-bins, and has for its object announcement by utilizing the actuating pressure of the grain on a movable part of the device.

In my invention I prefer to use an electric circuit, which circuit is closed by the weight of pressure of the grain. As the grain in the bin is filled in the closing of the electric circuit causes an electric current from an electric battery or dynamo in circuit to act upon an electric bell, annunciator, or indicator in circuit, and thereby warn by the ringing of a bell or indicate in any suitable manner that the grain-bin has been filled as full as desired to be. The electric circuit may be any desired length, and the conductor may be led in any suitable direction to any place or room desired, in which place or room there should be in circuit an electric bell and also a cut-off switch, so that the switch can be opened, and thereby the electric circuit broken, and the bell thereby stopped from further ringing, or an annunciator of any desired form may be placed in the electric circuit, which annunciator may be constructed to indicate the filling of any number of grain-bins required.

The grain-bins may be constructed in any suitable manner; but in the drawings of this specification the bins are shown as constructed by building scantling-timbers one above the other and nailed down one to the other and having their ends crossed at the corners of the bins and the crossed ends of the scantling-timbers nailed together.

Figure 2:
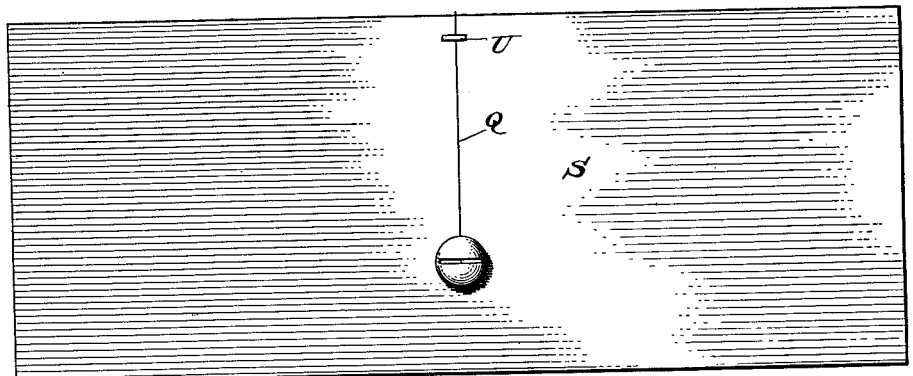
Figure 3:
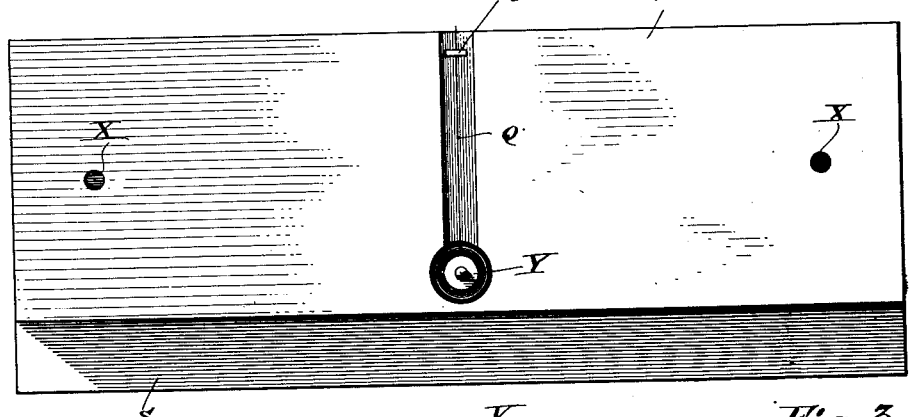
Figure 4:
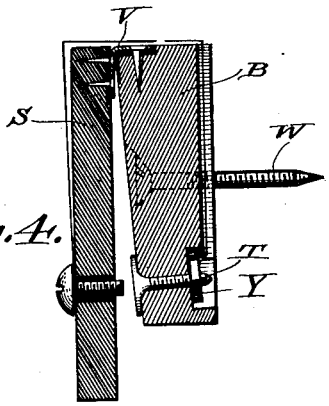

Figure 1 shows a view of two grain-bins and an office-room and also showing a suitable manner of placing the device and showing the left-hand bin filled with grain and the device acted upon and the electric circuit closed by the weight or pressure of the grain. In the right-hand bin is shown the grain filling into the bin and the apparatus not yet acted upon and not having yet received the weight or pressure of the grain and the electric circuit yet open. Fig. 2 shows a front view of the circuit-closing device. Fig. 3 shows a rear view of the circuit-closing device. Fig. 4 shows a cross-sectional view of the circuit-closing device.

My invention consists of the combination, with the interior of a grain-bin, of an indicating device actuated through the media of the weight or pressure of the grain filling into the bin, whereby the proportional filling of the bin is announced or indicated.

In the drawings forming part of this specification similar characters of reference denote the similar parts in all of the illustrations.

In my invention at A and B are shown end views of my circuit-closing device attached to grain-bins C and D, and at E and F is shown the grain in the bins.

At G and H are shown the pipes that conduct the grain into the bins.

At I is shown the hopper-shaped bottom of the bin D.

At J is shown the outlet-spout for the bin D, which spout passes through the side wall of the grain-storage house.

At K is shown the supporting-beam that carries the side of the grain-bin D, and at L is shown the beam that carries the hopper-shaped bottom of the grain-bin D.

At M is shown the window in the office-room.

At N is shown a window-shelf.

At O is shown an electric switchboard, and at P and P are shown cut-off switches.

At Q are shown the electric conductors.

At R is shown an electric bell; at R' the electric battery.

In my circuit-closing device at B is shown a supporting-base, and at S is shown the hinged swinging wing for carrying and closing the contact-point.

At T in the base is shown the stationary contact-point.

At U is shown the wire-holding staples.

At V are shown the hinges of the circuit-closing device, and at W a screw-nail for fastening the circuit-closing apparatus to the bin, and at X the screw-nail holes.

At Y is shown the bur on the stem of the stationary contact and which bur can be used to fasten the electric conductor to the stem of the contact.

To operate my invention, close the switch on the wires leading to the interior of the bin desired. The grain as it fills into the bin will rise in the interior of the bin until it flows against the swinging wing of my device, which wing carries a contact-point, and by the swinging of the wing the contact-point will be pressed against the opposite contact-point, thereby closing the electric circuit, and consequently ringing a bell or actuating any other suitable indicating device. Immediately after receiving the signal by the ringing of the bell or otherwise the person in charge should shut off the inflowing grain and then raise the cut-off switch at the same number as the number of the grain-bin that has been filled, and by thus breaking the electric circuit stop the bell from further ringing.

Having fully described my invention, what I claim is—

1. In combination with the interior of a grain-bin, an electric device, said device having a base, a hinged wing hung downward from the top front corner of the said base, said hung wing being adapted to be actuated on by the pressure of grain in the bin, normally separated metallic contacting parts adjusted in said base and said wing, metallic conductors arranged leading from said metallic contacting parts, and an indicating device in electric circuit leading to the contacting parts.

2. In combination with the interior side wall of a grain-bin, an electric device consisting of a swinging wing, said swinging wing having a contacting part, a contact part on the interior side wall of the bin, said contacting parts normally separated, said swinging wing adapted to be actuated into contact by the pressure of grain in the bin, said contacting parts connected in an electric circuit, and said electric circuit leading to an indicating apparatus.

3. As an article of manufacture adapted to be connected to the interior side wall of a grain-bin, an electric device, said device having a base, a hinged wing hung downward on the front of said base, said wing being adapted to be actuated by the pressure of grain in a grain-bin, metallic contacting parts adjusted in said base, and said wing and said contacting parts being adapted to be connected in an electric circuit.

In testimony whereof I affix my signature in presence of two witnesses.

DAVID H. HOUSTON.

Witnesses:
J. H. GALE,
EMIL BARRE.